Jan. 19, 1937.  V. KRUPA  2,067,933
FILM PROCESSING
Filed Dec. 6, 1933   2 Sheets-Sheet 1
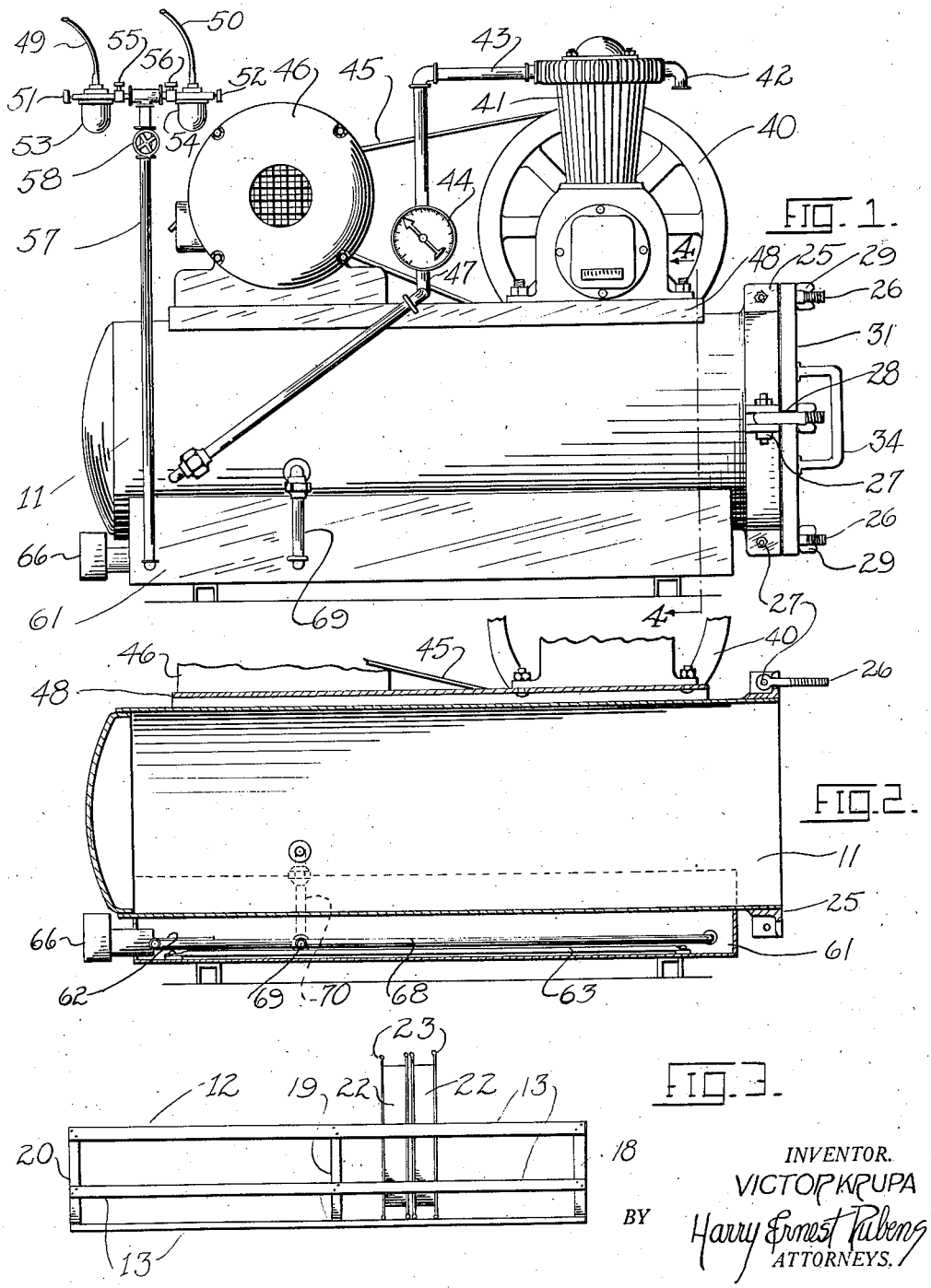
INVENTOR.
VICTOR KRUPA
BY Harry Ernest Rubens
ATTORNEYS.

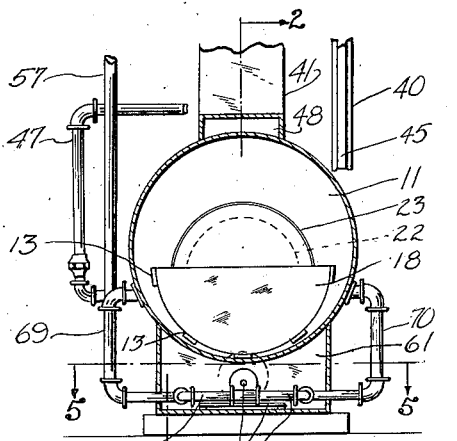
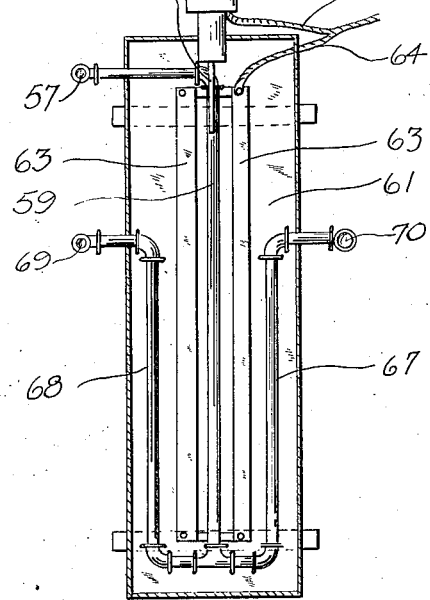

Patented Jan. 19, 1937

2,067,933

UNITED STATES PATENT OFFICE 2,067,933

FILM PROCESSING

Victor Krupa, Westwood, N. J., assignor to Edward Moyse, New York, N. Y.

Application December 6, 1933, Serial No. 701,119

4 Claims. (Cl. 95—88)

My invention relates to novel apparatus for and methods of treating gelatinous bodies, and more particularly relates to novel apparatus for and methods of treating the emulsion of exposed and developed motion picture films for increasing its durability and extending its life. As is well known to those skilled in the art, developed motion picture films are subjected to considerable wear and tear during their commercial usage. In use they are widely transported and accordingly subjected to widely varying weather conditions with the result that the film rapidly deteriorates, due to exposure.

I have discovered that I can overcome this condition and lengthen the life of the film by suitably treating it to render the easily soluble colloid substance composing the film emulsion into a new insoluble compound.

Accordingly, an object of my invention is to provide methods of and apparatus for treating developed films.

Another object is to provide apparatus for and methods of treating gelatinous bodies.

A further object is to provide novel apparatus for and methods of changing a soluble colloid substance into an insoluble compound.

Still another object of my invention is to provide novel apparatus for and methods of varying the soluble colloid substance composing the emulsion of an exposed and developed film into a new insoluble compound and fixing the so-treated film.

A further object of my invention is to provide novel apparatus for and methods of increasing the life and durablity of exposed and developed films and fixing the treated films.

Still another object of my invention is to provide novel apparatus for and methods of subjecting films to successive treatments of chemical vapors.

I have discovered that when films are rolled together in the normal manner and treated in accordance with my process described hereinbefore, the vapors penetrate sufficiently into the spaces which normally exist between successive windings to thoroughly treat the surface.

Accordingly, a further object of my invention is to provide a treatment for films with the films wound in a normal manner, the treating vapors used penetrating into the spaces between successive layers of the film.

Figure 1 is a side elevational view of a preferred form of apparatus used in carrying out my invention.

Figure 2 is a longitudinal cross sectional view of the apparatus shown in Figure 1.

Figure 3 is a detail of one form of rack used for mounting the films.

Figure 4 is a transverse cross sectional view through 4—4 of the cylinder shown in Figure 1.

Figure 5 is a longitudinal cross section through 5—5 of Figure 4, showing the heating unit assembly.

Referring now more specifically to Figures 1 and 4, my system comprises in general a cylindrical chamber 11 which, as will be described hereinafter, is arranged to receive successive charges of chemical vapors for treating exposed and developed films suitably supported within the chamber 11 by means of a rack 12, shown in Figure 3. Rack 12, an end view of which is shown in Figure 4, is arcuate in shape, comprising a series of ribs 13 suitably connected together by the frame members 18, 19 and 20. For purposes of illustration, I have shown two films 22 wound on reels 23 mounted in this rack construction, but in actual practice it will be understood that a number of such films mounted in face to face relation and extending along the entire length of the rack are simultaneously supported within the chamber 11. Mounted on the circumferential rim 25 on the end of cylinder 11 are a series of tie bolts 26, suitably supported on pivot pins 27, for securing the cylinder cover 31 in place, each of the tie bolts being adapted to fit into slots 28 along the circumferential edge of the cylinder cover 31, and being provided with winged nut members 29 by means of which the head is firmly secured in place to form an air-tight chamber. A handle 34 is suitably secured to the cylinder cover 31 for easily applying and removing the cylinder head.

As will now be understood, in order to treat the developed films, they are mounted on rack 12, Figure 3, the cylinder cover 31 being then removed, the rack together with the films thereon is slid into the chamber 11 until it is completely enclosed. The cover 31 is then put in place and the tie bolts secured to form an air-tight chamber.

I have discovered that the best results are obtained when the chamber is first completely exhausted before the films are chemically treated, thus insuring maximum penetration of the chemicals. To this end, I have provided an exhaust pump 41 having an outlet 42 and an intake line 43 extending through the pressure gauge 44. Line 47, connected at one end to the gauge 44, is connected at its opposite end to the chamber 11. Exhaust pump 41 is operated through the fly wheel 40 connected by means of the belt 45 to the electric motor 46 of any suitable construction. The vacuum pump and motor are mounted on the platform 48. Motor 46 operates the exhaust pump 41 to produce a vacuum of approximately 29½ inches in the chamber 11. After the tank has been suitably exhausted in this manner, it is prepared to receive the necessary chemicals for proper treatment. These are supplied from two different sources not shown, each of which is connected over its individual line 49 and 50 to atomizers 53 and 54 regulated by valves 51 and 52 respectively. The systems extend from these points through individual valves 55 and 56 to a common feed pipe 57 having a valve 58 therein and extending into the heating chamber 61, Figure 5, which is suitably secured as by welding or by rivets along the lower portion of the tank 11, as shown in Figures 1 and 2.

As shown in Figure 5, chamber 61 carries therein, in any suitable manner, heating units 63 preferably as shown made of strip heating material through which an electric current from the conductor 64 is transmitted. Included in the electrical circuit is a thermostat unit 66 diagrammatically illustrated and having a thermally responsive member 62 in series connection with conductor 64, by means of conductor 65 which, in response to a predetermined temperature, operates to open a circuit, discontinuing the current through the unit 63. Normally, however, when the temperature is approximately a predetermined value, the strip heater heats the passing gas to vaporization, the thermostat unit in this case keeping the electrical heating circuit closed.

The operation of the device will now be obvious. The films 22 are normally wound on reels 23 and mounted in the rack 12 shown in Figure 3, which is inserted longitudinally in the chamber 11. Motor 46 is then started into operation to operate the exhaust pump 41 until a predetermined vacuum condition is obtained in the chamber 11, as shown by the gauge 44. When this condition is obtained, the motor 46 is brought to a stop and the valve 55 is opened to permit the chemical received over the pipe 49, vaporized through the atomizer 53, to flow through the intake pipe 57 to the heating chamber over the conduit 59. In this portion of the system the chemical is completely vaporized by heating and passes through the pipes 67 and 68 and enters the exhaust chamber 11.

The chemical vapors in chamber 11 penetrate into the film and throughout the surface of each successive layer, reacting with the emulsion and converting the colloid substance into an insoluble compound.

It will be understood that any suitable chemical may be used for this purpose which does not affect the degrees of translucency and transparency of the film for projecting purposes.

This first treatment lasts sufficiently long to properly treat the film and I have found from experience that approximately ten minutes will suffice, although it will be understood that this in turn depends somewhat on the rate of flow and vaporization of the chemicals.

After the film has been suitably treated in this manner, valve 55 is closed to cut off further flow of chemicals from pipe 49 and valve 56 is opened to admit a new chemical received over the pipe 50 through its atomizer 54. This chemical, as in the first instance, flows through the same common conductor 57 to the heating chamber which during this time has been maintained at a predetermined temperature by the temperature control unit 66. This chemical, as in the previous case, is completely vaporized by heating in conduit 59 and then is carried over the conduits 67 and 68 to the exhaust chamber. Any suitable chemicals may be used for this part of the process which will fix the treated film to maintain it in insoluble condition, but it will be understood in this case also that the chemical must not affect the translucency and transparency of the film. In practice, I have found that this second operation should take approximately ten minutes, but in this case also it will depend on the chemical I use and the rate of vaporization.

After suitable treatment of films in this manner, the cover 31 is removed from the cylinder and the rack, together with the films, is removed, these films now being properly treated, and the system is then ready for treating another set of films.

Although for purposes of illustration, I have described a specific construction of tank and of the system, it will be understood that my invention is not necessarily limited thereto and that other constructions may be used for carrying out the general principle of my invention, which basically consists in the novel process for successive treatments of films to properly condition them. Accordingly, I do not intend to be limited by the above, but only as set forth in the appended claims.

I claim:

1. The method of treating exposed and developed film comprising subjecting said film to a relatively high vacuum, contacting said film with a treating agent for converting the colloid substance of the film into an insoluble compound, and introducing a second treating agent for fixing the treated film to maintain it in insoluble condition.

2. The method of treating exposed and developed film comprising enclosing said film in a container, evacuating said container to a relatively high degree, admitting to said container a vaporous treating agent having a temperature above atmospheric for converting the colloid substance of the film into an insoluble compound, maintaining said treating agent in contact with the film for a predetermined time and introducing a second treating agent for fixing the treated film to maintain it in insoluble condition.

3. The method of treating exposed and developed film comprising subjecting said film to a relatively high vacuum, contacting said film with a heated treating agent in relatively atomized condition for a predetermined period for converting the colloid substances of the film to an insoluble compound and introducing a second treating agent for fixing the treated film to maintain it in insoluble condition.

4. The method of treating a coil of exposed and developed film comprising inserting said film into a container and closing the container, evacuating said container to a relatively high degree, atomizing an agent for converting the colloid substance of the film into an insoluble compound and intimately contacting the film therewith and introducing into intimate contact with the film a second treating agent for fixing the treated film to maintain it in insoluble condition.

VICTOR KRUPA.